United States Patent [19]

Elgart

[11] 4,285,568

[45] Aug. 25, 1981

[54] MICROSCOPE STAGE

[76] Inventor: Alan Elgart, R.D. 4, P.O. Box 70B, Beakes Rd., New Windsor, N.Y. 12550

[21] Appl. No.: 65,890

[22] Filed: Aug. 13, 1979

[51] Int. Cl.³ ............................................. G02B 21/24
[52] U.S. Cl. ......................................... 350/90; 350/87
[58] Field of Search ............... 350/86, 87, 90; 356/30, 356/31

[56] References Cited

U.S. PATENT DOCUMENTS

| | | | |
|---|---|---|---|
| 3,549,232 | 12/1970 | Hugle | 350/90 |
| 3,669,524 | 6/1972 | Shio | 350/87 |
| 3,743,825 | 7/1973 | Cohen | 350/87 X |
| 3,826,558 | 7/1974 | Rasberry et al. | 350/86 X |

FOREIGN PATENT DOCUMENTS

| | | | |
|---|---|---|---|
| 1030286 | 3/1953 | France | 350/86 |
| 1117282 | 6/1968 | United Kingdom | 350/86 |

*Primary Examiner*—John K. Corbin
*Assistant Examiner*—Matthew W. Koren
*Attorney, Agent, or Firm*—Feldman & Feldman

[57] ABSTRACT

A stage for a microscope comprises a base having an aperture therein for supporting an article to be viewed. A vacuum device extends through the body for holding the article on the aperture. An illumination device extends through the body for illuminating the aperture.

14 Claims, 4 Drawing Figures

MICROSCOPE STAGE

BACKGROUND OF THE INVENTION

While the invention is subject to a wide range of applications, it is especially suited for use with a microscope and will be particularly described in that connection.

When using a microscope to view a small object such as a gem, it has been difficult to hold the gem and still be able to turn it in many directions to view its various facets. Also, there is a need to keep the specimen substantially in focus as it is turned. Further, illumination through the specimen is preferable in order to more clearly see its structure.

U.S. Pat. No. 3,723,006 to Thomas discloses a hollow vacuum probe which is used with a microscope and can be moved with the specimen remaining in focus.

U.S. Pat. No. 3,778,131 to Waneski discloses a microscope having a vacuum pick-up needle and spot illuminator.

It is an object of the present invention to provide a stage for a microscope which obviates one or more of the limitations and disadvantages of the described prior arrangements.

It is a further object of the present invention to provide a stage for a microscope which allows for movement of the specimen while it remains in focus.

A further object of the present invention is to provide a stage for a microscope which employs a vacuum to hold the specimen.

It is another object of the present invention to provide a stage for a microscope having an illumination device extending there through.

It is still further object of the present invention to provide a stage for a microscope which is relatively inexpensive to manufacture.

SUMMARY OF THE INVENTION

Accordingly, there has been provided a stage for a microscope comprising a base with an aperture therein for supporting an article to be viewed. A vacuum device extends through the body for holding the article on the aperture. An illumination device extends through the body for illuminating the aperture.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENT

Figure 1:
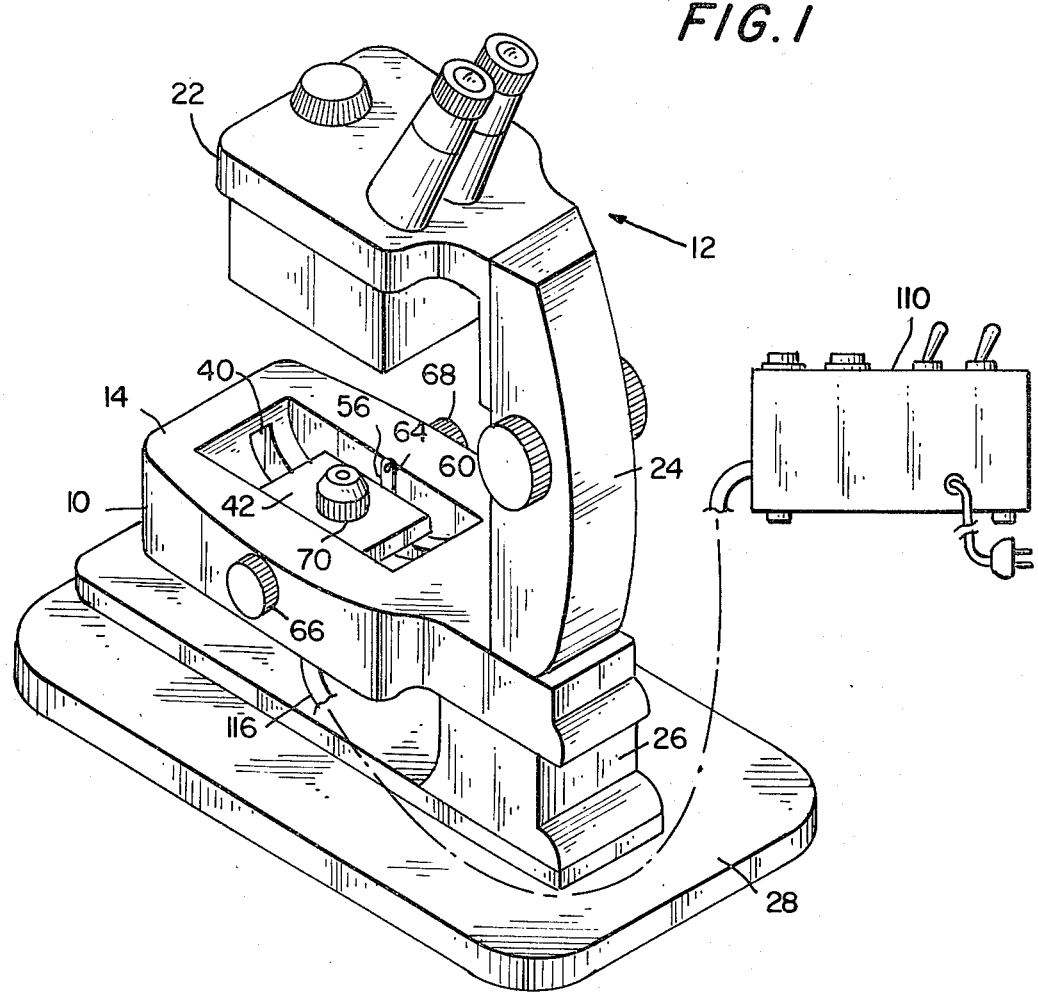
FIG. 1 is a plan view of a stage for a microscope in accordance with the present invention.

A stage 10 for a microscope 12 comprises a body structure 14 having an aperture 16 therein for supporting an article to be viewed. A vacuum device 18 extends through the body structure for holding the article on the aperture. An illumination device 20 extends through the body structure 14 for illuminating the aperture 16.

Referring to FIG. 1, there is illustrated a conventional microscope 12 having a lens head 22, a supporting neck 24, a bottom support 26 and a support plate 28. A stage 10 is affixed between the bottom support 26 and the supporting neck 24 in any conventional manner.

Figure 2:
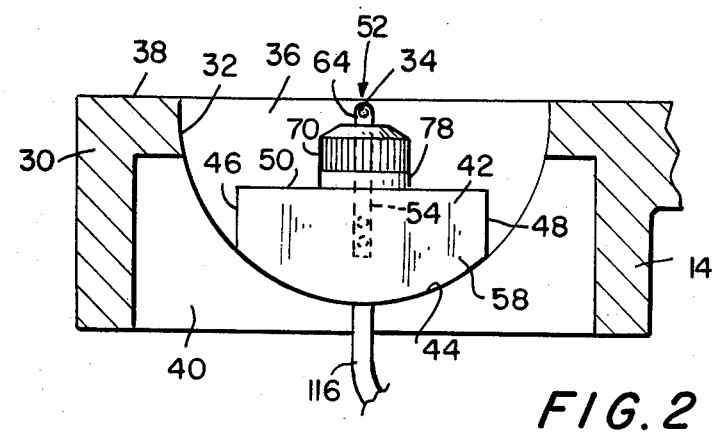
FIG. 2 is a side view, partly in cross-section, of the base portion of the stage.

Referring to FIGS. 1 and 2, there is illustrated the details of the stage 10. The stage includes a base structure 14. This base includes a stationary bottom section 30 with a concave top surface 32. This concave surface may have a circumference of slightly more than a semicircle with the center at a pivot point 34. The base structure includes two walls 36 which extend perpendicularly between the surface 32 and a top face 38 of the base structure 14. It is however, within the scope of the present invention to make the concave surface 32 in the shape of a hemisphere or any other desired configuration. A slot 40 extends along a large portion of the top surface 32 to accomodate the illumination and vacuum devices as will be further described.

The base structure 14 also includes a movable top section 42 having a convex bottom surface 44 which has a curvature that is accomodated by the top surface 32 whereby the movable top section can slide on the concave top surface 32. The top section 42 has two side walls 46 and 48 and a top face 50. Although the preferred embodiment has the side walls, it is within the scope of the present invention to increase the length of the bottom surface 44 until it meets the top face 50. The base structure includes a actuation device which slides the movable top section with respect to the stationary bottom section 30. This actuation device may include two side bars 54 and 56 which are attached at their bottom ends to the sides 58 and 60 of the movable top section in any desirable manner, such as for example, screws. The top of the side bars 54 and 56 are connected to the pivot point 34 by pivot rods 62 and 64. These pivot rods may extend through the base structure to knobs 66 and 68. The knobs are attached to the pivot rods in any conventional manner such as a gear mechanism, in order for the rods to hold the side bars in any position in which they are placed.

Figure 3:
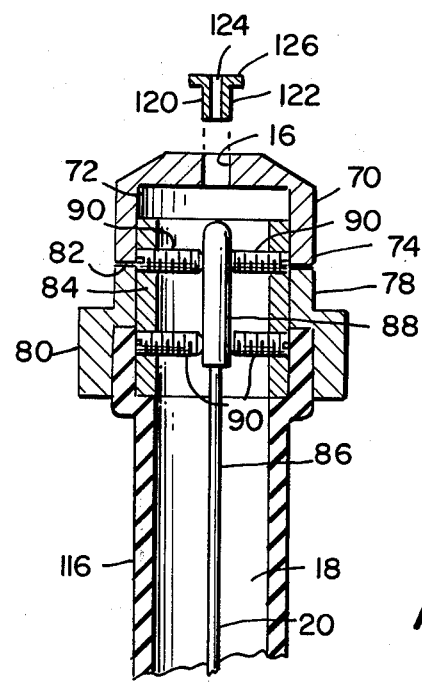
FIG. 3 is a side view, partly in cross-section, of the illumination device extending through the vacuum device.
Figure 3:
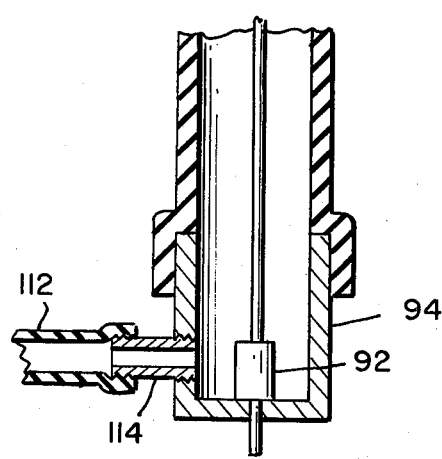

The base structure 14 also includes a rotatable tip 70 as best seen in FIGS. 2 and 3 which has an aperture 16 extending therethrough. A top face 71 may include a flexible seal surface (not shown) to create a tighter seal for the specific specimen or article. The tip 70 includes a circular inner wall 72 which extends to a circular bottom edge 74. A support element 76 includes an upper wall 78 and a lower wall 80. The lower wall 80 is secured within the movable top section 42 in any conventional manner. The top edge 82 of the wall 78 acts as a bearing surface against which the bottom edge 74 of the rotatable tip 70 rotates. An inner sleeve 84 is secured to the inner surface of the upper wall 78 in any desirable manner. The inner sleeve is used in conjunction with the illumination device 20 and the vacuum device 18 as will be further described.

An illumination device 20 includes a fiber-optic light tube 86 which includes a conventional fiber-optic bundle encased in tubing made out of any desirable material, such as for example, rubber, plastic or nylon. At one end of the light tube 86, an encasement sleeve 88 is affixed to the tube. The light tube 86 may be positioned within the inner sleeve 84 by a retainment device including a series of set screws 90 which are screwed into the sleeve 84 as shown. It is within the scope of the present invention to use any other retainment device to adjust the position of the encasement sleeve 88. The sleeve 88 is preferably positioned so that the light passing through the light tube is directed through the aperture 16. In addition, it is desirable to prevent the end of the light tube from being too close to the aperture as will be further described.

Figure 4:
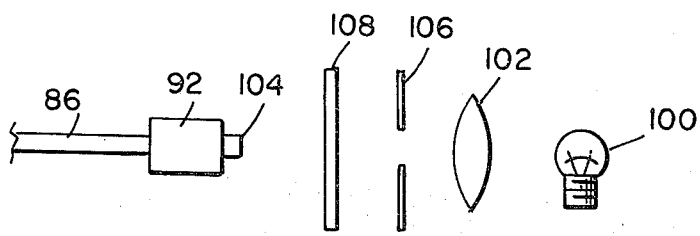
FIG. 4 is a schematic illustration of the light source for the illumination device.

The other end of the light tube 86 also has an encasement sleeve 92 for supporting the light tube against an end member 94. The end of the light tube extends through the end member to receive the light from the light source. Referring to FIG. 4, a schematic of the light source is provided. A lamp, such as for example, a tungsten light bulb 100 directs light through a lens 102 which focuses the light onto the tip end 104 of the fiber optic bundle. If desired, a conventional iris diaphragm 106 may be provided for controlling the brightness of the light which enters into the light tube. Also, a plurality of different colored optical fibers 108 may be provided to change the color of the light passing through the light tube.

The conventional electrical aspects of the illumination device 20 which are required to power the light bulb 100 as well as the lens, diaphragm, filter, and end member 94 may be provided in an illumination and vacuum control box 110, as seen in FIG. 1. The vacuum device 18 may include a conventional vacuum pump (not shown) in the control box 110. The vacuum may be pulled through a tube 112 to a fitting 114 which is connected into the end member 94 as best seen in FIG. 3. A vacuum tube 116, which may be made of any desirable material such as for example, rubber, plastic or nylon, is connected to the end member 94 on one end. The other end of tube 116 is connected between lower wall 80 and the inner sleeve 84. The ends of the vacuum tube can be sealed to the inner sleeve and end member in any conventional manner. The vacuum is now available at aperture 16. It is important that the sleeve 88 is not positioned to close to aperture 16 and cause any obstruction to the vacuum in the aperture.

An insert device 120 as seen FIG. 3 may be provided to fit within the aperture 16. The insert device includes a bottom circular wall 122 which tightly fits into the aperture 16. The aperture 124 is smaller than the aperture 16 and is useful for holding specimens which may be smaller than those that can be accomodated by the aperture 16. Also, s flexible seal (not shown) may be applied to the top face 126 of the insert device 120 to create a better seal between the specimen and the insert device.

In order to more fully understand the present invention, a description of its typical operation is provided. First the vacuum and light source may be turned on at the control box 110. Then a specimen may be placed on the aperture 16 of the rotatable tip 70. Since the light is passing through the aperture 16, a viewer looking through the microscopic head section would be able to easily focus the microscope as required. Also, the vacuum at the aperture provides ease in placing the specimen on the tip because of the tendency for the vacuum to pull the specimen towards the aperture. Also, once the specimen is securely held onto the tip, it does not have a tendency to fall off. If desired, the tip can be rotated 360° so that various sections of the specimen can easily be viewed. If it is desirable to look at other portions of the specimen not presently seen, the knobs 66 and 68 can be turned. This slides the movable top section 42 across the stationary bottom section 30. Since the pivot point 34 is located in the same plane as the top edge of the rotatable tip, no matter where the top section is placed, the specimen remains within view of the microscope. Of course, it may require some slight additional focusing depending on which part of the specimen is to be viewed. The slot 40 which is located in the stationary bottom section 30 allows the vacuum tube 116 to easily move along with the top section as it is being repositioned. Once the top section is repositioned, the rotatable tip can again be rotated to allow easy viewing of the specimen. It should be noted that the vacuum tightly holds the specimen against the aperture, irrespective of the position of the rotatable tip. In the event that a smaller or unusually shaped specimen is to be viewed, a suitable insert device 120 may be placed within the aperture 16 to accomodate this specimen.

It is obvious to one skilled in the art that there has been provided a stage for a microscope which allows for movement of the specimen while it remains in focus, is easy to adjust, provides a vacuum to hold the specimen and an illumination device extending therethrough and is relatively inexpensive to manufacture.

While there has been described, what is a present considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A stage for a microscope comprising:
   body means having an aperture therein for supporting an article to be viewed,
   vacuum means extending through said body means for holding the article on said aperture and,
   illumination means extending through said body means for illuminating said aperture.

2. The stage as defined in claim 1, further characterized in that said vacuum means includes a vacuum tube connected to said aperture.

3. The state as defined in claim 2, further characterized in that said illumination means includes a fiberoptic light tube extending through said vacuum tube.

4. The stage as defined in claim 3, further characterized in that said illumination means includes mounting means for centering said light tube so that light passes through said aperture.

5. The state as defined in claim 4, further characterized in that said illumination means includes optical filter means to change the color of light passing through said light tube.

6. The stage as defined in claim 5 further characterized in that said illumination means includes an iris diaphragm for changing the brightness of the light passing through said light tube.

7. The stage as defined in claim 3, further characterized in that said base means includes a rotatable tip means having the aperture extending therethrough for rotating said aperture.

8. The stage as defined in claim 7, further characterized in that insert means having an aperture therethrough are adapted to fit in the aperture of said tip means for accomodating different articles.

9. The stage as defined in claim 1, further characterized in that said base means includes a stationary bottom section having a concave top surface, a movable top section having a convex bottom surface adapted to slide in said concave top surface whereby said aperture moves through an arc of approximately 180°.

10. The stage as defined in claim 9, further characterized in that said stationary bottom section has a slot therein for accomodating said vacuum means and said illumination means.

11. A stage for a microscope comprising:
base means for supporting an article to be viewed, said base means including a stationary bottom section with a concave top surface, and movable top section with a convex bottom surface adapted to slide in said concave top surface through an arc of approximately 180°.

12. The stage as defined in claim 11, further comprising vacuum means associated with said bottom section for holding an article on said movable top section.

13. The stage as defined in claim 12, further comprising a rotating tip means connected to said movable top section for rotating said article through an arc of 360° with respect to said stationary bottom section.

14. The stage as defined in claim 13, further comprising angular measurement means for measuring said rotation of said article.

* * * * *